United States Patent
Ouvrier-Buffet et al.

(10) Patent No.: US 7,268,350 B1
(45) Date of Patent: Sep. 11, 2007

(54) BOLOMETRIC DETECTOR WITH THERMAL ISOLATION BY CONSTRICTION AND DEVICE FOR DETECTING INFRARED RADIATION THAT USES SUCH A BOLOMETRIC DETECTOR

(75) Inventors: Jean-Louis Ouvrier-Buffet, Sevrier (FR); Sylvette Bisotto, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 80 days.

(21) Appl. No.: 11/241,965

(22) Filed: Oct. 3, 2005

(30) Foreign Application Priority Data

Oct. 28, 2004 (FR) .................................. 04 11475

(51) Int. Cl.
*G01J 5/00* (2006.01)
(52) U.S. Cl. ................................. 250/338.1; 250/336.1
(58) Field of Classification Search ............. 250/338.1, 250/336.1
See application file for complete search history.

(56) References Cited

U.S. PATENT DOCUMENTS

| 5,021,663 | A | | 6/1991 | Hornbeck |
| 5,367,167 | A | | 11/1994 | Keenan |
| 5,656,848 | A | * | 8/1997 | Beratan et al. ............. 257/446 |
| 5,688,699 | A | * | 11/1997 | Cunningham et al. ........ 438/54 |
| 6,144,285 | A | | 11/2000 | Higashi |
| 6,201,243 | B1 | * | 3/2001 | Jerominek ............... 250/338.1 |

FOREIGN PATENT DOCUMENTS

EP 0 371 657 A2 6/1990

\* cited by examiner

*Primary Examiner*—David Porta
*Assistant Examiner*—Christine Sung
(74) *Attorney, Agent, or Firm*—Burr & Brown

(57) ABSTRACT

A bolometric detector including an absorbing part intended to convert incident electromagnetic radiation into calories, an active part (2) including a sensitive area made of a bolometric material the resistivity of which varies, in a known manner, with temperature, and electrodes that are in contact with the bolometric material (6) over at least part of their surface area. Support areas or posts (3) intended to maintain the active part (2) are suspended above a substrate (1) that accommodates, in particular, the read-out circuit associated with said detector and to ensure electrical conduction between the read-out circuit and the active part, the support areas or posts (3) have regions of non-uniform cross-sectional area between their point of contact with the substrate and the area where they are joined to the active part or being associated with elements that have such non uniformities.

10 Claims, 3 Drawing Sheets

BOLOMETRIC DETECTOR WITH THERMAL ISOLATION BY CONSTRICTION AND DEVICE FOR DETECTING INFRARED RADIATION THAT USES SUCH A BOLOMETRIC DETECTOR

This application claims the benefit of French Application No. 04.11475, filed Oct. 28, 2004, the entirety of which is incorporated herein by reference.

TECHNICAL FIELD

The present invention relates to a bolometric detector as well as the device for detecting infrared radiation that uses such detectors.

The invention has application areas in the field of infrared imaging in particular.

DESCRIPTION OF THE PRIOR ART

In infrared detectors, the use of devices configured in the form of an array and capable of operating at ambient temperatures, i.e. not requiring cooling to extremely low temperatures is known,—in contrast to detecting devices called "quantum detectors" which can only operate at extremely low temperature, typically that of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector generally consists of:
means of absorbing the infrared radiation and converting it into heat,
means of thermally isolating the detector so that its temperature can rise due to the effect of the infrared radiation,
thermometric means which, in the context of a bolometric detector, use a resistance element,
and means of reading electrical signals provided by the thermometric means.

Detecting devices intended for infrared imaging are produced as a one- or two-dimensional array of elementary detectors mounted on a substrate generally made of silicon which incorporates means of electrically exciting said elementary detectors and means of pre-processing the electrical signals generated by these elementary detectors.

These means of electrical excitation and pre-processing are thus produced on the substrate and constitute a read-out circuit.

A device comprising such an array of elementary detectors and an associated read-out circuit is generally placed in a package and is connected, especially electrically, to its external environment using classic technologies. The pressure inside such a package is reduced in order to limit thermal losses. The package also has a window that is transparent to the radiation to be detected.

In order to observe a scene using this detector, the scene is projected through suitable optics onto the array of elementary detectors and clocked electrical stimuli are applied via the read-out circuit (also provided for this purpose) to each of the elementary detectors or to each row of such detectors in order to obtain an electrical signal that constitutes an image of the temperature reached by each elementary detector.

This signal is then processed to a greater or lesser extent by the read-out circuit and then, if applicable, by an electronic device outside the package in order to generate the thermal image of the observed scene. FIGS. 1 and 2 show, respectively, a simplified perspective and top view of a bolometric detector according to the prior art. These Figures show the silicon substrate, referred to as (1), which accommodates, in particular, the read-out circuit.

This substrate accommodates an integrated electronic circuit which comprises, on the one hand, the devices that generate the stimuli for said detector and the devices to read out the signals output by the latter and, on the other hand, multiplexing components that make it possible to convert the signals output by the various detectors into serial form and send them to a reduced number of outputs so that they can be analysed by a processing system, especially an imaging system of traditional style.

The detector itself consists of a suspended membrane (2), above the substrate (1), most of which is intended to absorb incident radiation and convert it into heat, then into an electrical signal.

Said membrane (2) is suspended above the read-out circuit and therefore, in particular, substrate (1) by means of studs, posts or anchor points (3), more generically referred to as support areas or structures.

In this way, an empty space that extends to a height typically of 1 to 5 µm is defined between the substrate (1) and membrane (2).

These support structures (3) are essentially vertical. They conduct electricity, thus making it possible to apply the excitation potentials to the conductive parts or electrodes that are among the components of the actual bolometric detector itself via flat stretched structures (4) that also conduct electricity but are thermally resistant. These flat, stretched structures (4) are conventionally referred to as arms.

The suspended membrane (2) essentially comprises a layer (5) that absorbs incident thermal radiation.

This absorption of radiation causes heating of this layer which transfers the temperature thus accumulated to a layer (6) deposited on the membrane that acts as a thermometer and is made of a bolometric material.

This bolometric material traditionally consists of slightly or highly resistive p or n type polycrystalline or amorphous silicon but may also be made of vanadium oxide ($V_2O_5$ or $VO_2$) made in a semiconducting phase or even ferrites with a spinel structure.

As already stated, electrodes, conventionally located in the same plane as the detector, are used in order to define the electrical signal in the bolometric detector and these are referred to as coplanar electrodes or stacked electrodes or a sandwich structure as disclosed, for example, in American Patent U.S. Pat. No. 5,021,663.

The various parameters that affect the level of performance of an uncooled bolometric detector include, in particular, mastering the design and construction of the elementary detectors and, especially, the micro bridges and posts, especially thermal isolation between the read-out circuit (1) and the suspended membrane (2).

As already indicated, the space between the active part of the bolometer and the substrate comprising the read-out circuit, possibly coated with a layer that reflects infrared radiation, is a void apart from the posts or support areas (3) in order to prevent thermal losses due to solid conduction.

The space is also usually filled with low-pressure gas in order to limit convection and conduction by gases.

Generally speaking, thermal isolation of the membrane (2) is provided by relatively narrow isolating arms (4) consisting of the thinnest possible layers. Depending on the way they are made, these isolating arms (4) are located in the same plane as the membrane (2) or even produced below the latter (see for example U.S. Pat. No. 5,367,167).

Although they fulfil their function of isolating and supporting the membrane relatively satisfactorily, these arms nevertheless have the drawback of penalising the performance of the bolometric detector because of the reduction in the fill factor they cause, especially if they are located in the same plane as said bolometric membrane. Increasing the length of these arms substantially or reducing their width and/or thickness significantly comprises the rigidity of the structure. In fact, these elements are a mechanical weak point that affects the stability of the micro bridges which may then topple or deform and consequently cause the membrane to come into contact with the substrate, thereby creating thermal bridges that destroy the thermal isolation of said membrane.

SUMMARY OF THE INVENTION

The invention aims first of all to optimize the thermal isolation of the membrane of a bolometric detector without thereby degrading its mechanical stability, especially that of the micro bridges from which it is suspended. It then aims to improve the performance of such a detector by increasing the fill factor.

To achieve this, the invention involves not only altering the dimensional features of the arms but also working on the structure of the thermal resistance at the level of the link between the micro bridges and the support.

Thus, it relates to a bolometric detector comprising:
an absorbing part intended to convert incident electromagnetic radiation into calories,
an active part which itself consists of:
a sensitive area made of a bolometric material the resistivity of which varies, in a known manner, with temperature,
electrodes that are in contact with the bolometric material over at least part of their surface area,
support areas or posts intended to maintain said active part suspended above a substrate that accommodates, in particular, the read-out circuit associated with said detector and to ensure electrical conduction between said read-out circuit and said active part, said support areas or posts having regions of non-uniform cross-sectional area between their point of contact with the substrate and the area where they are joined to the active part; or being associated with elements that have such non uniformities.

In other words, the invention involves working on the morphology of the support areas in order to optimise the thermal isolation of the suspended membrane. This uses a physical phenomenon referred to as "constriction".

Producing a point-type thermal contact or a contact having an extremely small cross-sectional area between two materials causes constriction of the flux lines which results in a significant increase in the thermal contact resistance.

This phenomenon can advantageously be exploited by technologies for uncooled detectors and hence, in particular, in the field of bolometric detectors, in order to increase the thermal isolation of said detectors. This being so, this phenomenon applies particularly well, but not exclusively, to obtaining vertical contact resistance.

This constriction phenomenon can be described as follows. Let us take the fundamental case of a semi-infinite medium of thermal conductivity k bounded by a plane that is assumed to be isolated apart from over a surface s having a characteristic dimension a of limited extent which is subjected to a uniform temperature or heat flux of uniform density. The temperature field inside the medium changes from T∝ to T0 but this change is mainly confined to the vicinity of s in a hemisphere having a radius of 10a. The constriction resistance in this medium can be determined analytically. The condition at the boundaries of the real contact area is either an imposed temperature condition or an imposed flux condition. The values of the constriction resistances (in K/W) obtained are as follows:

$$R_c = \frac{8}{3\pi^2}\frac{1}{ka}$$

for a flux condition imposed on the disc having a radius a and $$R_c = \frac{1}{4ka}$$

for an imposed temperature condition.

The constriction resistance therefore appears to be inversely proportional to the characteristic dimension a rather than to the surface s. It also depends on the type of thermal condition imposed on the surface s. The contact resistance is slightly less for a temperature condition than for a uniform flux density condition. In reality, the thermal conditions are intermediate between these two types of conditions and the constriction resistance values lie between these two situations.

When the heat flux lines are channelled in a tube of finite diameter, the constriction phenomenon is weaker than in a semi-infinite medium.

In this case, for an imposed temperature condition and $$\frac{a}{b} \le 0.3$$

where b is the radius of said tube:

$$R_c = \frac{1}{4ka}\left(1 - 1.41\frac{a}{b}\right)$$

Finally, in the case of thin films, if the thickness of the layer reduces, the constriction resistance also depends on the condition at the boundaries on the face opposite the contact area.

Thus, for the limiting conditions of flux imposed on the disc of radius a, the same as on the opposite face, the thermal contact resistance is higher than for a thick medium. The contact resistance is then expressed as follows:

$$R_c = \frac{1}{4ka}\left(1 - 1.41\frac{a}{b}\right)f(l, a, b) \text{ with } f(l, a, b) \ge 1$$

where l is the thickness of the layer and f represents a function that modulates $R_c$ depending on the geometric parameters.

In reality, the thermal resistance comprises two components derived:
firstly from convergence of the thermal flow lines towards the area of lowest temperature in accordance with the mechanisms mentioned above; the contact areas should therefore be of reduced size so as to generate constriction regions,
and secondly from the contact resistance at the interfaces of the thin-film layers that ensure contact. Generally speaking, contact between two solid media is only obtained in a certain umber of areas of small surface area depending on the roughness (≈1%) between which there remains an interstitial medium (in the case of microbolometers, it can be assumed that there is a vacuum). As the conductivity of the interstitial medium is low compared with that of the media that are in contact, this produces convergence of the flux lines towards the contact areas which causes a micro constriction effect similar to that described above but on a nanostructure or microstructure scale.

Ultimately, this analysis shows that one can increase the thermal isolation of bolometric membranes by modifying several factors. The effect of constriction can be improved by altering the contact shape and dimensions and hence the support areas or posts. This is especially important for insulating media. The contact resistance effect (micro constriction at the level of surfaces that are in contact) depends essentially on the metallurgical structure of the materials used. In this respect, it can be advantageous to use materials such as aerogels and xerogels.

BRIEF DESCRIPTION OF THE DRAWINGS

The manner in which the invention can be implemented and its resulting advantages will become more apparent from the typical embodiments below, given merely by way of example, reference being made to the accompanying drawings.

FIGS. 3 and 4 illustrate a first way of implementing the invention in principle. According to this, the studs or posts (3) are of traditional style but their upper end is not fixed directly to the bolometric membrane (2) but to an intermediate frame (9) which makes it possible to separate the fabrication of the isolating arms, that of the spikes or micro spikes (7) described below and that of the membrane (2). This intermediate frame corresponds to the associated element mentioned earlier in the general definition of the invention.

Frame (9) can be made of any material. However, it is preferable to use a material selected from the group comprising SiO, SiN, TiN or a material from which the active suspended part is made.

This frame (9) has micro spikes (7), the pointed tips of which are in contact with the bolometric membrane (2).

These micro spikes are an integral part of the frame and are therefore made of the same material as the latter. Nevertheless, it is perfectly possible to envisage making said micro spikes from a different material.

In addition, the frame and the micro spikes conduct electricity. However, this conduction may be only partial to the extent that both the frame and the micro spikes may have a conducting core covered by an insulating material or vice versa, i.e. a core made of an insulating material covered in a conductive layer. In addition, the materials used to make the micro spikes are not necessarily identical to those used to make the frame.

Figure 1:
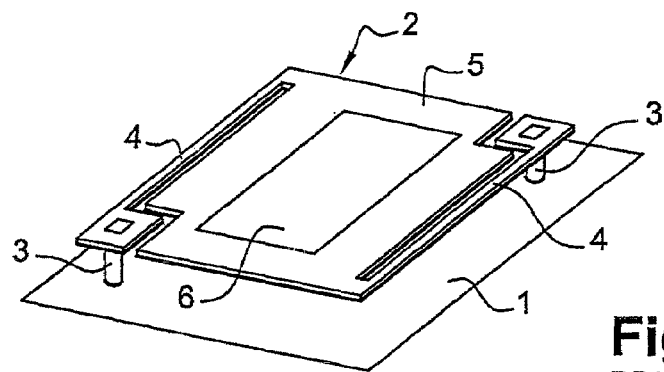
FIGS. 1 and 2 illustrate, as already stated, a perspective and top view of an elementary bolometric detector according to the prior art.
Figure 2:
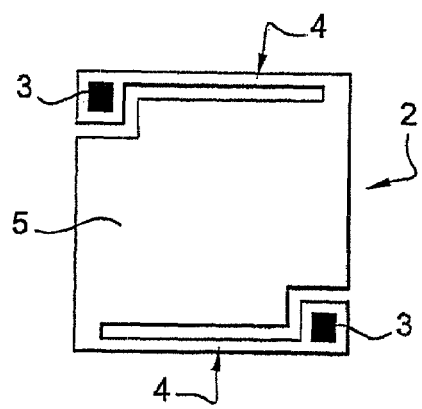
Figure 3:
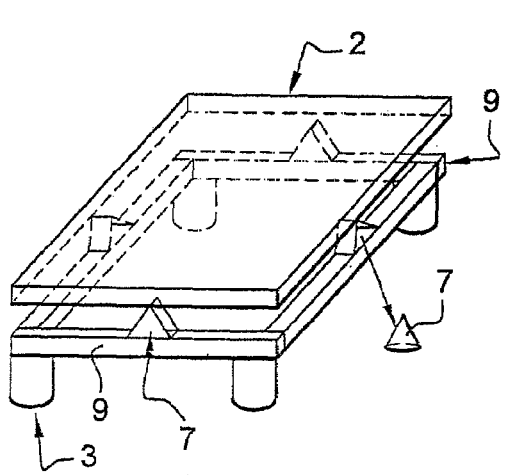
FIGS. 3 and 4 show, schematically, a first embodiment of the invention.
Figure 4:
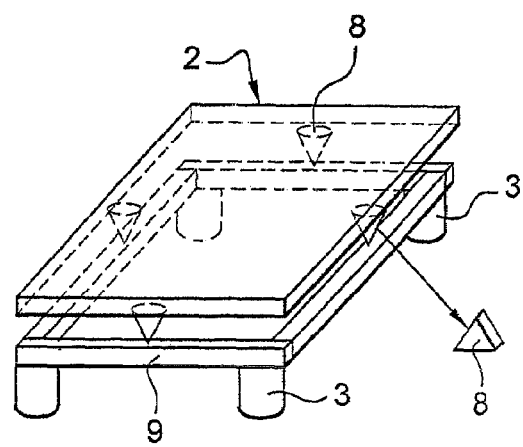

In the configuration in FIG. 3, the areas where the thermal flux lines are constricted are mainly located on the membrane (2). FIG. 4 is similar to FIG. 3 apart from the fact that the micro spikes (8) have a substantially inverted configuration because their tip points down towards the frame. In this configuration, the micro spikes may be part of said membrane or be made of a different material. In addition, the areas where the thermal flex lines are constricted are chiefly located in the frame.

The studs or posts (3) rest on the read-out circuit, the frame (9) and the bolometric membrane (2) are produced using conventional microelectronics and microtechnology processes.

Micro spikes that point towards the membrane (2) can be made, for example, as follows. A layer of photosensitive resin is spread out on the structure intended to form said micro spike. A disc, the diameter of which is substantially equivalent to twice the thickness of the layer that constitutes the structure is lithographed. This assembly is then immersed in an appropriate etching solution depending on the nature of the material. The rate of horizontal etching that results in over-etching under the resin mask equals the vertical etching rate. The structure changes over time into a micro spike shape.

Obviously, this method must be adapted to the underlying sandwich structure that is already present. In particular the material or materials of which the spikes are made may be an electrical insulator or an electrical conductor such as silica or a nitride.

Figure 5:
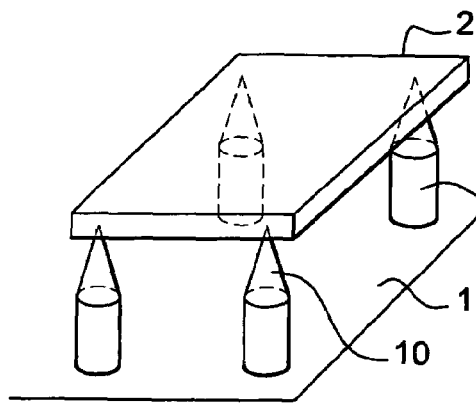
FIGS. 5 and 6 illustrate a second embodiment of the invention.
Figure 6:
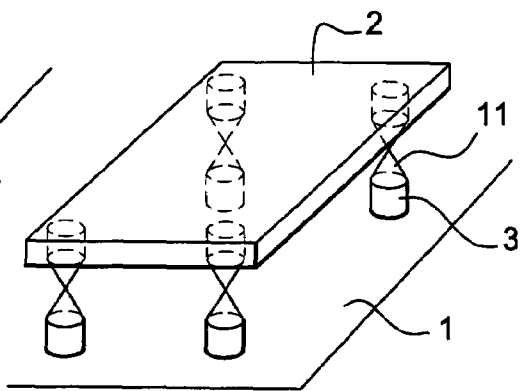

In a second configuration of the invention as shown in FIGS. 5 and 6, the bolometric membrane rests directly on micro spikes (10, 11) that are an extension of the posts or support areas (3), hence without any intermediate frame.

In FIG. 5, the microspikes are not made of the same material as the membrane and the support areas. In contrast, in the configuration described in FIG. 6 where the micro spikes are mounted tip to tip, the material of said spikes and membrane (2) are identical.

According to one advantageous embodiment, the membrane also has isolating arms making it possible to increase the thermal resistance.

Said membrane is made using conventional techniques.

Thus the structure (5) that supports the thermometer material (6) consists of two insulating layers that enclose metal electrodes. The insulating layer deposited on the metal layer that constitutes the electrodes comprises contact openings in order to connect the thermistor. Etching of the thermometer material makes it possible to expose the materials in the regions that separate the detectors (reticulation).

In another embodiment that is also known, the structure that supports the bolometric material consists of an insulating layer on which metal electrodes that are totally in contact with the thermistor rest. Etching of the thermometer material makes it possible to expose the materials in the regions that separate the detectors.

This type of sandwich structure produces a component that is optimised in terms of signal-to-noise ratio.

These structures can be produced using various processes that result in the fabrication of micro bridges.

Microbolometer technology is implemented on a sacrificial layer made of polyimide having a thickness of 1 to 5 µm, preferably equal to a quarter of the wavelength to be detected so as to produce a quarter-wavelength cavity between the electrodes and the reflector (metallic material deposited on the multiplex or read-out circuit) that ensures maximum absorption.

The thin-film layers (having a thickness from 0.005 µm to 0.1 µm for example) of insulating elements (SiN, SiO, ZnS, etc.) are obtained using low-temperature deposition techniques that are customarily used for these materials: cathode splattering, plasma decomposition (PECVD). These materials are generally etched by using plasma-assisted chemical etching processes.

The metal materials (Ti, TiN, Pt, etc.) that constitute the electrodes are preferably deposited by cathode splattering. These metallised areas are defined by chemical or plasma etching processes. The thickness of these layers is from 0.005 µm to 0.1 µm. The sheet resistance of the layer that constitutes the electrodes will be adjusted so as to encourage the absorption of IR radiation.

The thermometer material can be an amorphous or polycrystalline semiconductor (Si, Ge, SiC, a-Si:H, a-SiC:H, etc.) obtained using low-temperature deposition techniques that are customarily used for these materials: cathode sputtering, thermal decomposition (LPCVD) or plasma decomposition (PECVD).

Any doping of these layers is produced by introducing a doping gas (BF3, PH3, etc.) in the reactor or by ion implantation. These materials are generally etched using plasma-assisted chemical etching processes. This may involve a metal material or even a vanadium or ferrite oxide.

The process to etch the sacrificial layer is adapted to suit the nature of the layer. It is preferably a plasma etching process.

Figure 7:
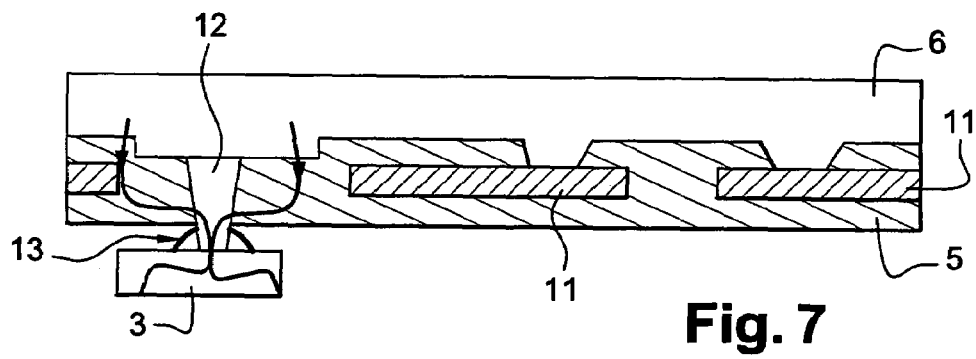
FIG. 7 is a schematic cross-sectional view of a detail of a bolometric membrane in accordance with the invention.

A first embodiment of a constriction area in the vicinity of the bolometric membrane in accordance with the invention is described in relation to FIG. 7.

In this example, the opening of the hole (12) in layers (5, 6) constituting the bolometric structure and the sacrificial layer (not shown) is produced firstly by using high-resolution electronic or optical photolithographic means and secondly with the aid of dry etching equipment. 50 nm holes are currently feasible in association with classic technologies (spacer techniques, etc.) many publications report this, such as, for example, "Fabrication of thin-film metal nanobridges" Ralls et al.—Appl. Phys. Letter 5(23), 4 Dec. 1989).

Also, the dimensions of the pivot (13) located between the lower surface of the membrane and the support (frame (9) or support area (3)) can always be reduced by using an isotropic plasma etching process that is suitable for the thermometer material, thereby favouring thermal isolation of said membrane.

In order to increase the thermal resistance even more, roughness of the interface with the support (frame (9) or support area (3)) can be obtained during deposition of the thin-film layers. Nevertheless, such roughness can be obtained more reliably by appropriate heat treatments that leave voids resulting from interdiffusion of materials. An appropriate chemical treatment can also be used to etch the interdiffusion regions or even simply expose the grain boundary. Although the surface area of the materials that are in contact in relatively large, the effective thermal contact surface is around 1% of that.

Figure 8:
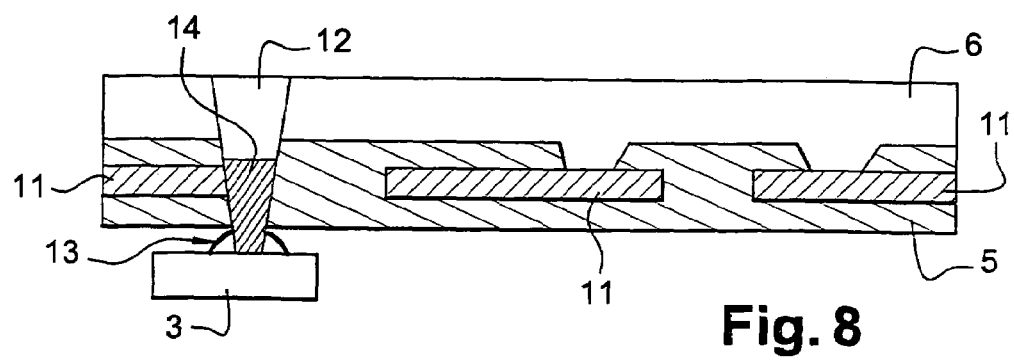
FIGS. 8 to 10 are views similar to FIG. 7 of other membranes in accordance with the invention.

In the configuration described in relation to FIG. 8, constriction of the thermal flux lines is obtained by using porous materials, for example silica or carbon polymer based aerogel type materials (as described in the document entitled "Ordered porous materials for emerging applications"—NATURE—Vol. 417-20 June 2002).

Figure 11:
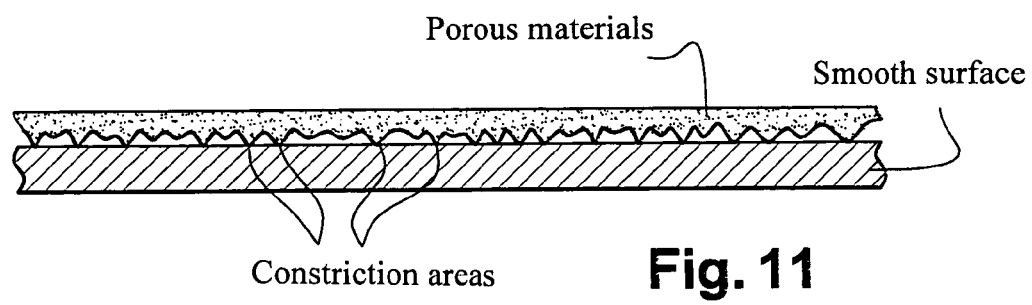
FIG. 11 aims to illustrate the contact between a porous material and a smooth surface.

FIG. 11 schematically shows the contact between a porous material and a smooth surface. In it one can see, in particular, that this contact actually consists of a plurality of areas configured as spike shapes that are the result of the physics of the porous material used and are capable of constituting the constriction areas sought-after within the meaning of the present invention.

According to this configuration (FIG. 8), the opening of hole (12) through the layers (5, 6) of the bolometric structure is obtained in the same way as previously. The material that constitutes the spike is deposited over the entire surface of the device preferably using the sol-gel method. This material is then etched (self-aligned etching process) in order to localise the spikes near the holes in order to form supports for the bolometric membrane.

Depending on the nature of the material used to produce the contact spike, the latter's contribution to the thermal resistance is not negligible in terms of pure constriction. This is particularly true if the spike is made of an aerogel type material that has a very low thermal conductivity such as a silica-based gel. In fact, once they are in a vacuum, these materials have a thermal conductivity of the order of 0.02 $Wm^{-1}K^{-1}$ M, i.e. two orders of magnitude below that of silicon oxide or nitride. The thermal constriction resistance and the thermal resistance of the spike are then in series and are therefore cumulative and this improves the performance of the device.

Aerogels are extremely porous materials (porosity from 84% to 99.5%). They are produced by using a sol-gel process. Preparing an aerogel therefore involves obtaining a gel. This gel can be obtained simply by destabilising a sol consisting of a suspension of silicon particles in water. Aggregation of the particles results in the formation of a gel. One can also hydrolyse an organosilicate in solution in an alcohol in order to cause polycondensation of the radicals. Under certain chemical conditions (alkaline pH), this forms particles that then assemble in the same way as in the previous case. In a neutral or acid solution, polycondensation results in the formation of a polymer and also gives rise to a gel.

The solid porous material referred to as an aerogel is obtained by drying the gel. Drying in air causes densification and often splitting of the solid backbone: the air-liquid separation surface propagates into the structure and capillary forces heavily disrupt the lattice. In order to obtain an aerogel, the solvent is brought to temperature and pressure conditions that are above the critical point. The solvent can then be removed without damaging the solid part. The macroscopic density obtained depends on the initial organosilicate concentration of the solution. It may be very low: aerogels having a density of 4 $kg/m^3$ can be produced. It is also possible to use aerogels that conduct electricity in order to ensure electrical bonding between the bolometric membrane and the support/frame or the read-out circuit. Carbonaceous or organic aerogels have electrical resistivities which are perfectly suitable in this respect.

Figure 9:
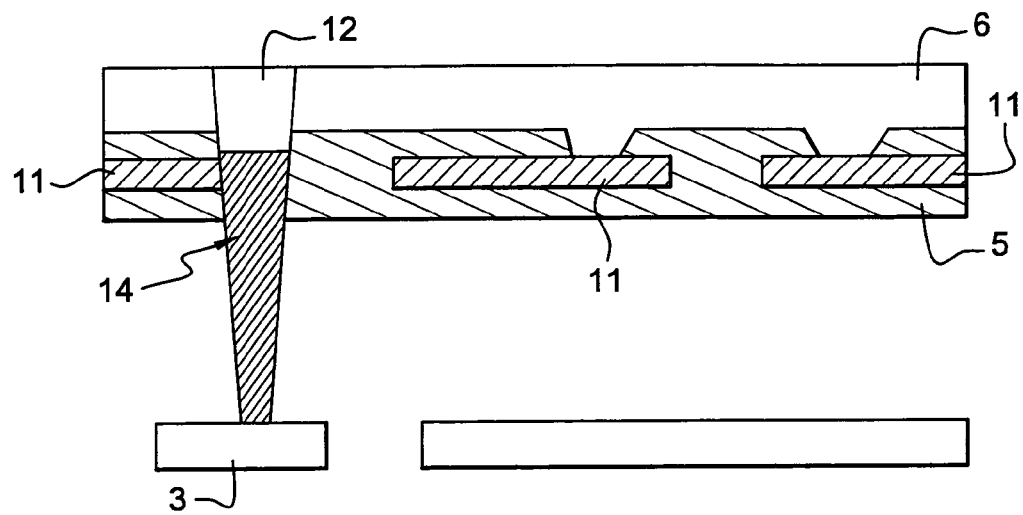

The view shown in FIG. 9 is similar to that in FIG. 8 in the sense that it also uses a spike made of an aerogel material. However, it is intended to illustrate the constriction area at the interfaces between the spike and frame or spike and substrate or read-out circuit.

Figure 10:
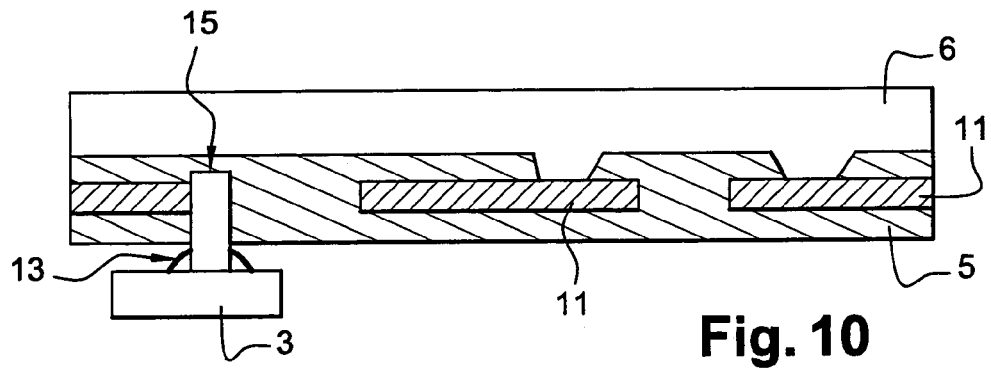

Finally, FIG. 10 shows the principle whereby the thermal flux lines are constricted using nanotubes or nanowires. It this configuration the spike is made as a carbon nanotube or nanowire.

A carbon nanotube is grown catalytically, i.e. growth requires the formation of catalysing clusters. Growth can be obtained in a Plasma Enhanced Chemical Vapour Deposition setup at a temperature that is compatible with the read-out circuit. A flow of acetylene and ammonia is introduced into the growth chamber and, through thermal decomposition, makes it possible to form the walls of the nanotube. The ammonia makes it possible to etch the graphite carbon formed on the top of the tube. Besides its function of generating carbon particles, the plasma orients the nanotubes vertically thanks to the voltage applied. The size of the catalysing stud determines the diameter of the nanotube.

The following advantage is apparent from the present invention. Using conventional posts according to the prior art provides a minimum cross-section or diameter of 1 µm. In contrast, the spikes produced within the framework of the present invention can have a diameter of the order of 100 Å or even of the order of 10 Å for nanotubes. Given this fact and as it has been shown that the constriction resistance is inversely proportional to the diameter of said constriction areas, there is a gain of the order of a factor of 100 or even 1,000 for nanotubes compared with conventional posts and, consequently, this improves the thermal resistance and hence the thermal isolation of the suspended membrane extremely significantly. Ultimately, this improves the performance of detecting devices that use such bolometric detectors considerably. In a known manner, these bolometric detectors are designed as a linear or array configuration.

The invention claimed is:

1. A bolometric detector comprising:
   an absorbing part intended to convert incident electromagnetic radiation into calories;
   an active part consisting of:
      a sensitive area made of a bolometric material the resistivity of which varies, in a known manner, with temperature,
      electrodes that are in contact with the bolometric material over at least part of their surface area;
   support areas or posts maintaining said active part suspended above a substrate that accommodates the read-out circuit associated with said detector and ensuring electrical condition between said read-out circuit and said active part,
wherein each of said support areas or posts has a region of non-uniform cross-sectional area located along a longitudinal line extending between a point of contact with the substrate and an area where the support area or post is joined to the active part, said region of non-uniform cross-sectional area being geometrically solid along said longitudinal line.

2. A bolometric detector as claimed in claim 1, wherein said regions of non-uniform cross-sectional area are in the form of spikes or chokes creating an area where constriction of thermal flux between said active part and the substrate is likely to occur.

3. A bolometric detector as claimed in claim 2, wherein the spikes or chokes are made of the same material as that of the active part.

4. A bolometric detector as claimed in claim 2, wherein the spikes or chokes are made of at least one material that is different from that of the active part.

5. A bolometric detector as claimed in claim 2, wherein at least said regions of non-uniform cross-sectional area are made of at least one material selected from the group comprising $SiO_2$, $Si_3N_4$, TiN or of a material that constitutes said active part.

6. A bolometric detector as claimed in claim 2, wherein said regions of non-uniform cross-sectional area are made of a porous material creating areas where constriction of thermal flux between said active part and the substrate is likely to occur.

7. A bolometric detector as claimed in claim 6, wherein the porous material is made of an aerogel.

8. A bolometric detector as claimed in claim 7, wherein the aerogel is made from silica.

9. A device for detecting infrared radiation comprising a plurality of bolometric detectors as claimed in claim 1.

10. A device for detecting infrared radiation as claimed in claim 9, wherein the bolometric detectors are designed as a linear or array configuration.

* * * * *